Nov. 22, 1932. H. A. VAN VALKENBURG 1,888,894
TOOL FOR PNEUMATIC TIRES
Filed Aug. 22, 1930
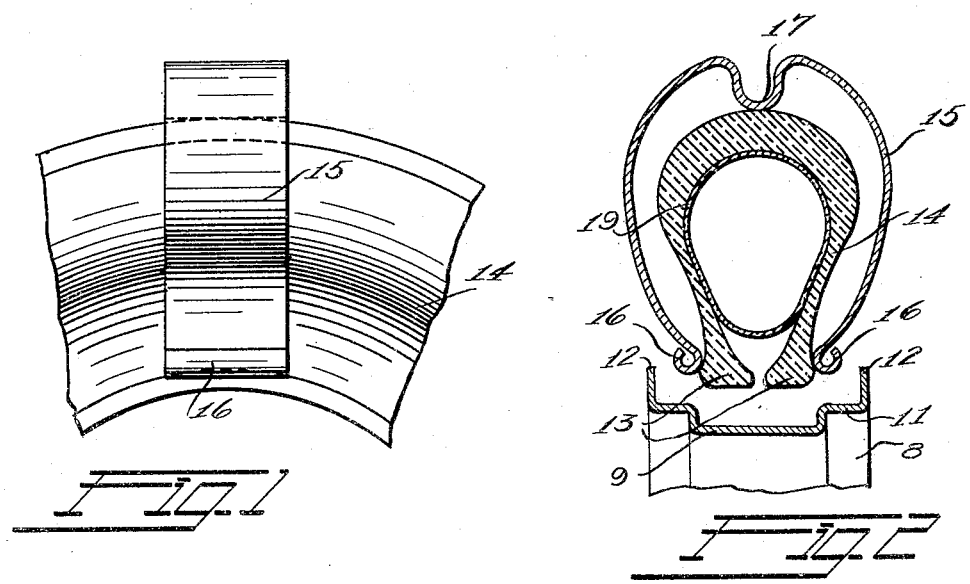
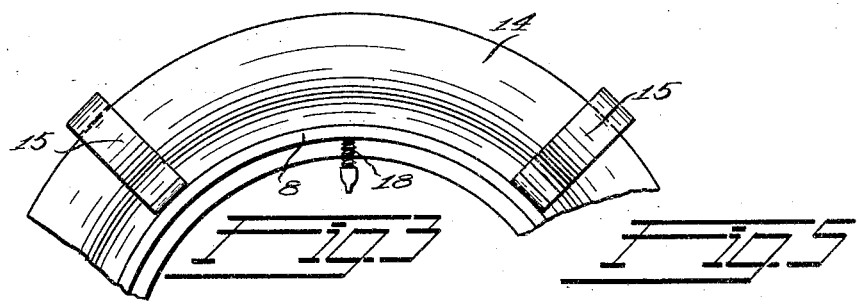
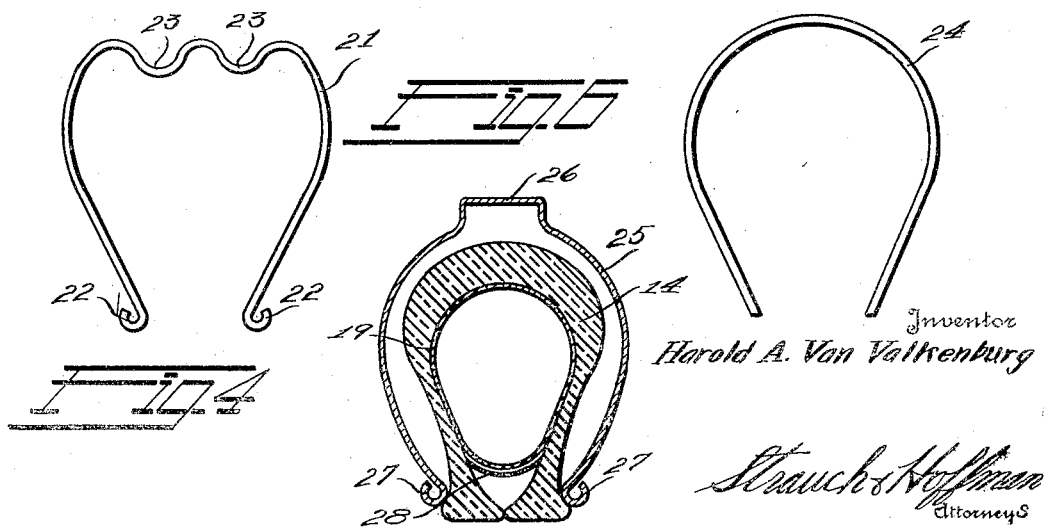
Inventor
Harold A. Van Valkenburg
Strauch & Hoffman
Attorneys Patented Nov. 22, 1932

1,888,894

UNITED STATES PATENT OFFICE

HAROLD A. VAN VALKENBURG, OF VAN NUYS, CALIFORNIA

TOOL FOR PNEUMATIC TIRES

Application filed August 22, 1930. Serial No. 477,083.

This invention relates to a tool used to expedite the handling of pneumatic tires and the placing and removal thereof on their metal rims.

In many automobiles now in use, the pneumatic tires are mounted upon metal rims having a well in the center to allow the beads of the tire to drop therein. The positioning and removal of tires on this type of rim is quite troublesome, due to the fact that the rim is usually endless and the tire must be stretched over the rim, and the beads thereof positioned to properly engage the larger diameter edges of the rim. Furthermore, as is well known, the pneumatic tires frequently become stuck to the rim or are "frozen" thereto such that the removal of the tire is quite difficult. In some instances it becomes necessary to so force the tire away from the rim that the sides of the tire are damaged.

One object of my invention is to provide a simple and readily manipulated tool for contracting the opposite beads of a pneumatic tire so that the same may be readily positioned on and removed from the rim.

Another object of this invention is to provide a readily attachable and removable hand grip for a pneumatic tire which serves to keep the inner tube and flap in proper position while the tire is being handled separate from its rim.

Another object of the invention is to provide a simple inherently resilient tool which may be readily positioned on a pneumatic tire for contracting the beads thereof from the larger diameter of the rim to the smaller center diameter and which will remain in its set position, leaving the hands of the operator free to manipulate any other form of tool to remove or replace the tire on the rim.

Another object of this invention is to provide a tire tool of the above character which is sufficiently resilient to compress the beads of a pneumatic tire, and one which is capable of being simply removed from and attached in position.

A further object of this invention is to provide a simple tire tool which is inexpensive to manufacture and simple to use.

These and other objects of the invention will be apparent from the following description and the appended claims when taken in connection with the accompanying drawing wherein:

Figure 1 is a side elevation of one embodiment of this invention.

Figure 2 is a cross section showing the form of invention in Figure 1, as applied to a tire.

Figure 3 is a broken side elevation of a pneumatic tire on its rim showing two of my novel tools applied thereto.

Figures 4 and 5 are elevational views of modified forms of my invention.

Figure 6 is a view similar to Figure 2 showing another modification.

Referring to Figures 1 and 2, the rim 8 thereof is of the drop center type having a center well 9 and the flat portions 11 on each side thereof upon which the tire beads 13 normally rest, in engagement with outwardly projecting flanges 12 of the rim.

In order to facilitate the positioning of the beads 13 of the tire 14 over the flanges 12 and on flat portions 11 this invention contemplates the provision of one or more steel spring bands 15 adapted to partially encircle the tire 14. When in use the band 15 has its lower ends normally positioned so as to press the beads 13 of the tire towards one another, these lower edges engaging the side walls of the tire, as shown in Figure 2. In order to prevent injury to the tire and to facilitate removal of the band 15 the lower ends thereof may be turned-up as at 16 to provide curved portions for engagement with the sides of the tire.

In order to provide a hand grip whereby the tool may be readily positioned on and removed from a pneumatic tire, and to provide a handle for picking up the tire, the upper portion thereof is provided with a downwardly extending bend 17, positioned to engage the tread of the tire to thus properly position the tool and to leave sufficient space on each side of the bend 17, in order that the operator may grasp the band 15 to put the same in position and remove it.

The operation of my novel tire tool, when used on tires applied to drop center rims, will be obvious from the above description when taken in connection with Figures 2 and 3. Preferably two or more of the tire tools 15 are used and are positioned at spaced points around the tire on opposite sides of the valve stem 18. In order to remove the tire from its rim, two resilient bands 15 are positioned on opposite sides of and approximately equally spaced from the valve stem 18 of the tire, as seen in Figure 3. The inherent resiliency of the bands 15, which are made of stiff steel, is normally sufficient to draw the beads 13 of the tire inwardly. If the tire sticks to the rim it is only necessary to press on the lower portions of the bands 15 to assist them in freeing the tire beads.

As seen in Figure 2 the beads 13 of the tire are drawn together sufficiently to clear the flat portions 11 of the rim 8, whereby the beads may enter the drop center portion 9 of the rim. Replacing or removal of a tire with respect to its rim is thus greatly facilitated, since the section of the tire having the edges compressed by the band 15 may be moved toward the rim so that the beads 13 enter the drop-center 9, the tire and rim thus being eccentric. At the opposite side of the tire the beads 13 move a corresponding distance outward from the rim to thus clear the outwardly extending flanges 12 thereof. Thus the tire may be easily moved transversely with respect to the rim to pass over the flanges 12 and the beads 13 within the drop center portion 9 may then be slipped out and the tire is thus removed from the rim without the necessity of using tools to stretch the tire. Reverse operation results in the tire being easily placed on the rim.

An important feature of this invention is the fact that this novel tire tool leaves the hands of the operator free to manipulate any tools necessary to stretch the tire over the flanges 12 of the rim. The resiliency of the bands 15 serves to hold the tire in the position shown in Figure 2 and the bands stay in position and yet do not interfere with the usual tire irons necessary to stretch the tire.

It will be noted from Figure 2 that the contraction of the beads 13 serve to push the inner tube 19 upwardly within the tire casing 14, whereby the tube cannot be pinched between the rim and the tire or between the rim and any tools which may be used to stretch the tire over the rim. Furthermore, when my novel tire tool is in position it is not necessary to hold it or to maintain it in any way, since it is sufficiently stiff to perform its function without further operation by the user thereof.

Another important advantage of my novel tire tool is that it provides a readily attachable and detachable handle for handling a tire when the same is removed from its rim, and for maintaining the tube and flap in proper position in the tire. As is well known, the inner tube and the flap, when used, must be carefully positioned in the tire without wrinkling thereof to prevent pinching of the inner tube. When these members have been positioned in the tire they readily slip out of position when the tire is being handled preparatory to mounting on the rim. By the positioning of two or more of my novel tire tools on such a tire, the depending edges or jaws thereof compress the side walls of the tires together to efficiently maintain the tube and the flap within the tire. Obviously this use of my novel tire tool is not limited to tires used on drop center rims, but is applicable to all pneumatic tires having separable tubes therein.

In Figure 4 is illustrated a slightly modified form in which the band 21 is provided with the turned up ends 22, and has at its upper portion a reverse bend to provide two downwardly curved portions 23 to engage the tread of the tire. In this form the tool 21 may be readily grasped at the portions on each side of the bends 23 or at the upwardly curved portion between the same for ready manipulation thereof.

Obviously means other than the downwardly bent portion to space the bands from the tire to provide a ready means to grip them may be provided, such as variously bent portions or attached or integral handles, all of which are within the purview of this invention.

In Figure 5 I have illustrated a very simple form of my invention, wherein the band 24 simply comprises a steel spring member bent to conform substantially to the shape of the tire. In this form of my invention the lower portions are not turned up nor is the upper portion provided with a bend to engage the tread of the tire. The form of my invention shown in Figure 5 may be manufactured very cheaply and yet this tool will readily and efficiently perform the functions for which it is designed.

In Figure 6 is illustrated another embodiment of my invention illustrating a different type of handle for the tool and clearly showing how the tool maintains the tube and flap in position in a tire. In this form of my invention the resilient band 25 has an outwardly bent handle 26 at the upper portion thereof and has the turned up portions 27 to engage the lower walls of the tire 14. The tube 19 in the tire and the flap 28 thereof are maintained within the tire and consequently cannot slip out of position when the tire is being handled preparatory to placing it on the rim. This feature of my invention is clearly applicable to tires which are not used with the drop-center rims having the upstanding portions thereof such as shown at 12 in Figure 2. By positioning two or more of the bands shown in Figure 6 around a tire, after the tube and flap have been inserted, the tire may be picked up bodily without fear of the tube and flap becoming detached and the tire may be mounted on any type of rim by the usual tools used for this purpose.

Various other shapes of bands may be provided, so long as the resiliency thereof is sufficient to press the tire as shown in Figures 2 and 6. Also, the resilient bands may be formed in two or more separate pieces riveted or otherwise secured together to form the general shape as shown.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. A tire tool for use in removing and replacing pneumatic tires on their rims comprising a resilient band having a curved upper portion conforming generally to the shape of the tire, and having depending ends engageable with the opposite sides of a tire to compress the same, said resilient band being sufficiently stiff to compress the sides of the tire so that the beads thereof are substantially in contact with one another.

2. A tire tool for use in removing and replacing a pneumatic tire on its rim and for handling the tire comprising a resilient spring metal band adapted to partially encircle the tire, having depending portions normally spaced from one another a distance less than the width of a rim adapted to receive the tire, said portions engageable with the sides of said tire to compress them by the inherent stiffness of the band to a distance less than the width of the rim adapted to receive the tire.

In testimony whereof I affix my signature.

HAROLD A. VAN VALKENBURG.